R. W. DAVIS.
UNIVERSAL JOINT.
APPLICATION FILED JUNE 23, 1917.

1,270,602.

Patented June 25, 1918.
2 SHEETS—SHEET 1.

Inventor
Robert William Davis,
By Frederick V. Winters
Attorney

R. W. DAVIS.
UNIVERSAL JOINT.
APPLICATION FILED JUNE 23, 1917.
1,270,602.
Patented June 25, 1918.
2 SHEETS—SHEET 2.
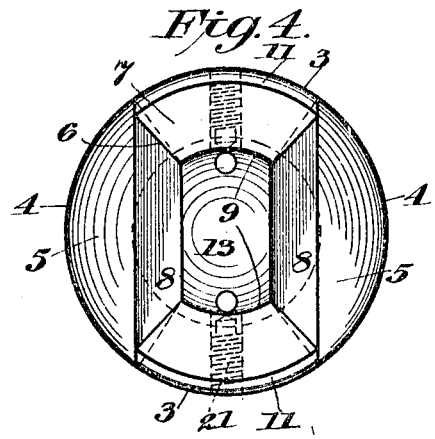
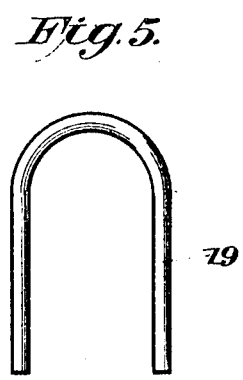
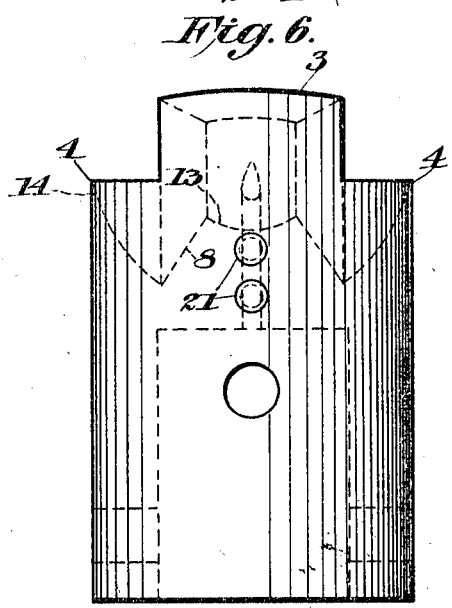
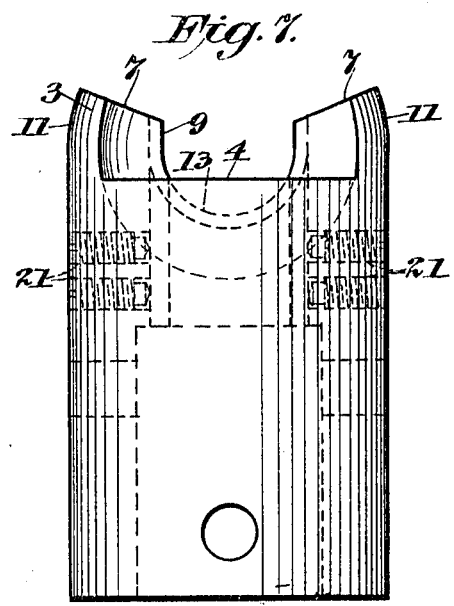
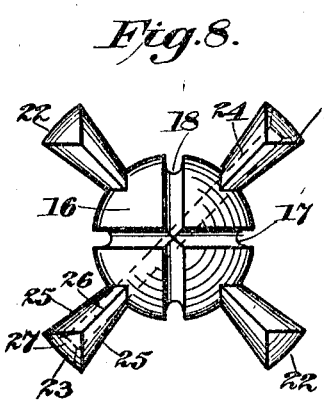
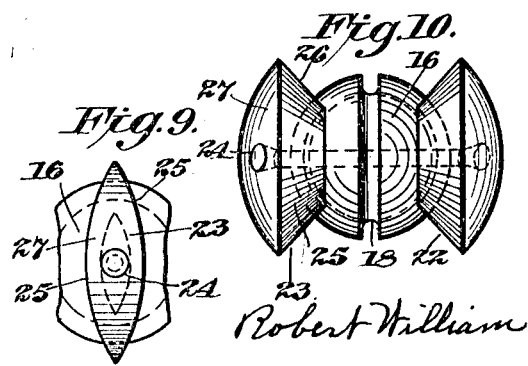
Inventor
Robert William Davis
By Frederick V. Winters
Attorney

UNITED STATES PATENT OFFICE.

ROBERT WILLIAM DAVIS, OF EAST ORANGE, NEW JERSEY.

UNIVERSAL JOINT.

1,270,602.

Specification of Letters Patent.   Patented June 25, 1918.

Application filed June 23, 1917. Serial No. 176,479.

*To all whom it may concern:*

Be it known that I, ROBERT WILLIAM DAVIS, a citizen of the United States, residing at East Orange, in the county of Essex and State of New Jersey, have invented certain new and useful Improvements in Universal Joints, of which the following is a full, clear, and exact specification.

This invention relates to universal joints, and has for one of its objects to produce the strongest universal joint of a given diameter.

Another object is to provide a universal joint with the largest possible bearing surfaces, so as to prevent it from quickly wearing out. Other objects will appear as the description proceeds.

The invention will be first hereinafter described in connection with the accompanying drawings, and then more specifically defined in the claims at the end of the description.

In the accompanying drawings, wherein similar reference characters are used to designate corresponding parts throughout the several views:—

Fig. 4 is an end view of one of the similarly-shaped supplemental members of the joint.

Fig. 5 is a detailed view of one of the yokes used for fastening the members of the joint together against relative axial movement.

Figs. 6 and 7 are detailed side elevations of one of the supplemental members of the joint, said views being taken at right angles to each other.

Fig. 8 is a plan view of the spider which is arranged between the two supplemental members.

Fig. 9 is a detailed outer face view of one of the lunes of the spider, and

Fig. 10 is a side elevation of the spider.

Figure 1:
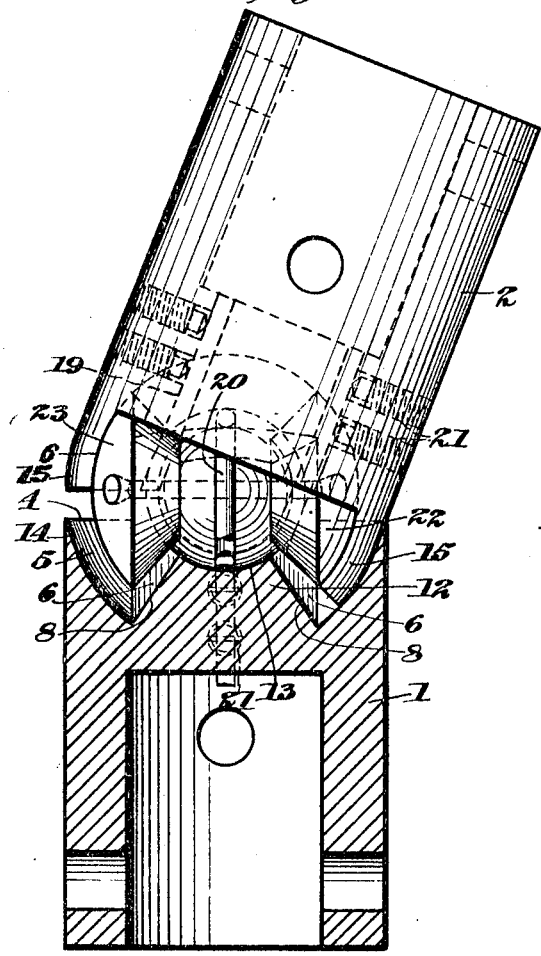
Figure 1 is a broken side elevation of the members of the universal joint assembled, and one member turned at the maximum angle with respect to the other member.
Figure 2:
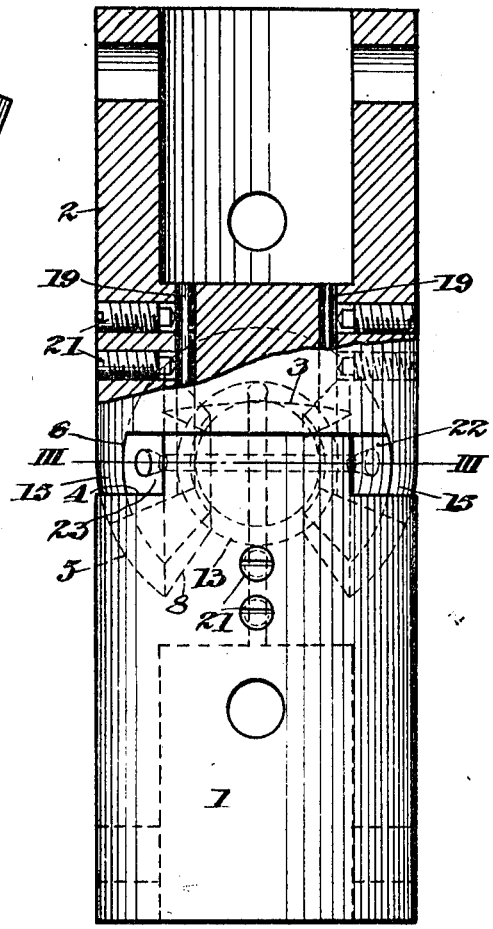
Fig. 2 is a broken side elevation of the joint in straightened position.

The two supplemental members 1 and 2 of the joint are similar in formation, so that a description of one will suffice in most respects. Referring then to the member 1, it is cylindrical in form with two diametrically opposite projecting prongs 3 having their inner faces ball-reamed at 9 and their lateral edges and ends machined conically, as at 6 and 7, respectively. Between the prongs 3 concavo-spherical recesses are formed extending inwardly from the straight edges 4. The outer surfaces of said recesses are spherical, as at 5, while their inner surfaces are conical, as at 8, the latter being at opposite sides of a projection or U-shaped internal rib 12 formed on the prongs and separating the recesses into annularly extending segments. The upper face of said projection 12 is ball-reamed with the inner surfaces of the prongs 3. The outer surfaces of the prongs 15 of the member 2 beyond the center of the joint are spherical at 11 and fit into the spherical outer faces of the recesses in the member 1, and the prongs 3 of the member 1 are similarly formed to fit in the recesses of the member 2. The marginal portions 14 of the recesses are conical with their elements tangential to the spherical surfaces, half the angle of said cone determining the maximum bend of the joint as shown in Fig. 1. The prongs are cut just short enough so as not to interfere with the members turning to the maximum angle.

Between the two members 1 and 2 there is arranged a spider comprising a ball or sphere 16 having four radiating lunes, of which two diametrically opposite ones 22 are preferably made integral with the ball, while the other two lunes 23 are fastened to the sphere by a rivet 24. The sphere 16 is provided with transverse grooves 17 and 18 in which are fitted U-shaped yokes 19 which are secured to the respective members 1 and 2 by set screws 21. These yokes serve to lock the members of the joint together against relative axial movement, but do not interfere with the universal movement of each member with respect to the other.

Figure 3:
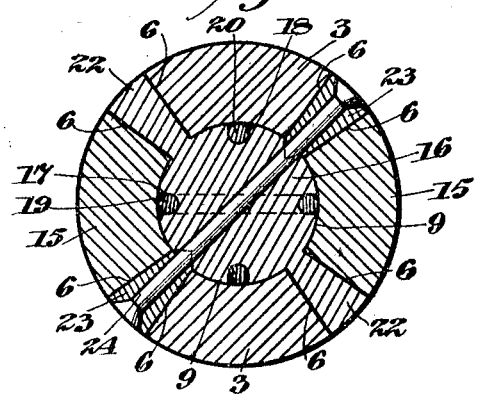
Fig. 3 is a section on the line III—III of Fig. 2.

The lunes 22 and 23 fit between the lateral faces 6 of the prongs 3 and 15 of the members 1 and 2, as best shown in Fig. 3. The curved lateral faces 25 of said lunes bear against said lateral faces 6 of said prongs, while the spherical outer faces 27 of said lunes fit the spherical surface 5 of the recesses between the prongs. The conical lateral faces 25 merge into inclined edges 26 at the ends of the lunes.

Having thus described my invention and what I claim as new and desire to secure by Letters Patent of the United States is:—

1. In a universal joint, the combination, with two supplemental members, each having diametrically opposite prongs and concavo-spherical recesses between said prongs, the ends of the prongs of one member fitting in said recesses of the other member, of a spider comprising a sphere arranged between the two members, and radiating lunes on said sphere fitting between the lateral faces of the prongs.

2. In a universal joint, the combination, with two supplemental members, each having diametrically opposite prongs and concavo-spherical recesses between said prongs, the ends of the prongs of one member fitting in said recesses of the other member, of a spider comprising a sphere arranged between the two members, and radiating lunes on said sphere fitting between the lateral faces of the prongs, and means for locking the members together against relative axial movement.

3. In a universal joint, the combination, with two supplemental members, each having diametrically opposite prongs and concavo-spherical recesses between said prongs, the ends of the prongs of one member fitting in said recesses of the other member, of a spider comprising a sphere arranged between the two members, and radiating lunes on said sphere fitting between the lateral faces of the prongs, said sphere being also provided with transverse grooves, and yokes fitted in said grooves and fastened to said members for locking them together against relative axial movement.

4. In a universal joint, the combination, with two supplemental members, each having diametrically opposite prongs and segmental concavo-spherical recesses extending annularly between the lateral faces of said prongs, the outer surfaces of the prongs of each member, beyond the center of the joint, being spherical to fit into the recesses of the other member, of a spider comprising a sphere fitted between said members, and radiating lunes fitted between the lateral faces of the prongs, the outer faces of said lunes being spherical to also fit into the recesses of said members.

5. In a universal joint, the combination, with two supplemental members, each having diametrically opposite prongs and concavo-spherical recesses extending segmentally between the lateral faces of said prongs, the outer surfaces of the prongs of each member, beyond the center of the joint, being spherical to fit into the recesses of the other member, the marginal portions of said recesses being conical with their elements tangential to the spherical surfaces of the recesses and determining the maximum bend of the joint, of a spider comprising a sphere arranged between said members, and radiating lunes on said sphere fitted between the lateral faces of the prongs.

6. In a universal joint, the combination, with two supplemental members, each having diametrically opposite prongs, of a spider comprising a sphere arranged between the two members, and radiating lunes on said sphere fitting between the lateral faces of the prongs, said ball also having transverse grooves in its surface, and yokes fitted in said grooves and fastened to said members for locking them against relative axial movement.

7. In a universal joint, the combination, with two supplemental members each having diametrically opposite prongs with conical lateral faces, of a spider comprising a sphere arranged between the two members, and radiating lunes on said sphere fitting between the conical lateral faces of the prongs, and means for locking the members together against relative axial movement.

8. In a universal joint, the combination, with two supplemental members each having diametrically opposite integral prongs and concavo-spherical recesses between the said prongs, the ends of both prongs of each member fitting and extending into the recesses of the other member when the joint is straight, of a spider comprising a sphere arranged between the two members, and radiating lunes on said sphere fitting between the lateral faces of the prongs.

9. In a universal joint, the combination with two supplemental members each having diametrically opposite integral prongs and concavo-spherical recesses between said prongs, each of said recesses having an uninterrupted outer wall to fit the outer face of one of the prongs on the other member, of a spider comprising a sphere arranged between the two members and radiating lunes on said sphere fitting between the lateral faces of the prongs.

10. In a universal joint, the combination, with two supplemental members each having diametrically opposite prongs which join at their base forming a U-shaped internal rib with conical lateral faces and a concavo-spherical inner face at its base, there being concavo-spherical recesses in each member one at each side of the base of said U-shaped prongs, the ends of both prongs of each member fitting and extending into the recesses of the other member when the joint is straight, of a spider comprising a sphere arranged between the two members, and radiating lunes on said sphere fitting the lateral faces of said prongs.

In testimony whereof I have signed my name to this specification.

ROBERT WILLIAM DAVIS.